Aug. 8, 1933.    C. NORDMANN    1,921,258
COLOR PHOTOGRAPHY
Filed March 15, 1930    2 Sheets-Sheet 1
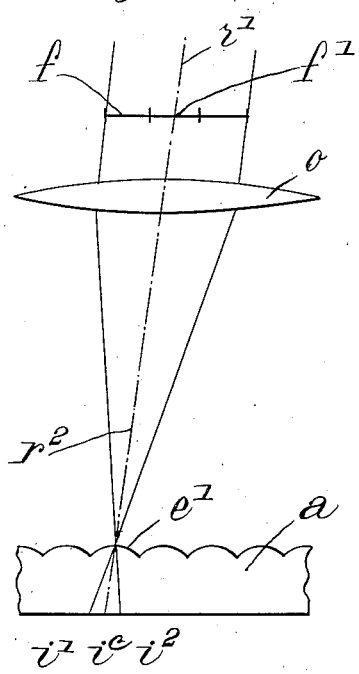
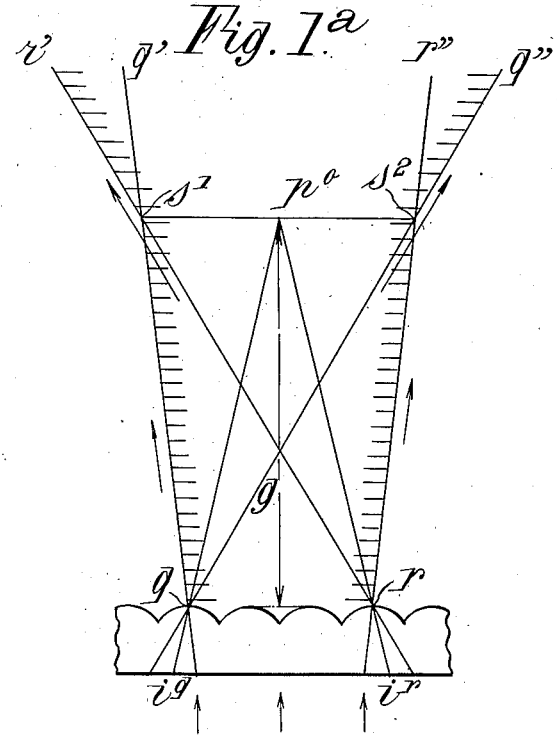
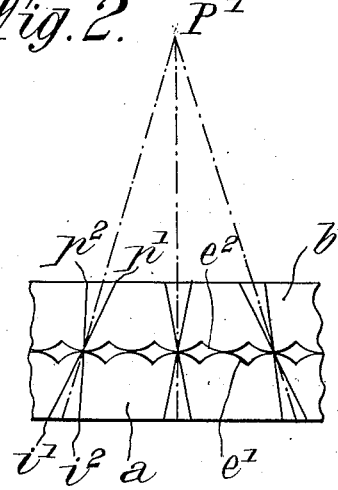
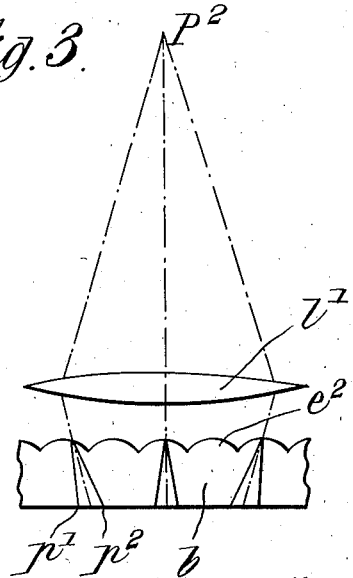

Patented Aug. 8, 1933

1,921,258

UNITED STATES PATENT OFFICE 1,921,258

COLOR PHOTOGRAPHY

Charles Nordmann, Paris, France

Application March 15, 1930, Serial No. 436,063, and in France August 19, 1929

5 Claims. (Cl. 88—16.4)

The present invention relates to the copying and connected projection of colored lenticular photographs.

One of the objects of the invention is to provide a method and means for projecting such colored photographs under conditions of maximum light efficiency.

Another object is to provide a method and means for projecting such colored photographs formed with color screens and lenticular film surfaces so that the relative position of the film, the color screen, and the projecting objective may be different than the corresponding relative positions during the taking of the picture, and so that the relative effective apertures of the photographic objective and the projection objective may be different.

A further object is to provide a novel method and apparatus for making and projecting reproductions on a second lenticular color film of an image photographed on a first lenticular color film.

Still further objects will appear in the course of the detailed description now to be given with reference to the accompanying drawings, in which:

Fig. 1 is a diagram illustrating the trajectory of what will hereinafter be designated the "elementary beams" coming from a lenticular color photograph when illuminated on the back side.

Fig. 1ª is a diagram illustrating the shape of the whole beam of light coming from such a lenticular color photograph.

Fig. 2 is a diagram of the lightbeams in the contact process of reproduction of a lenticular color photograph made in the usual way.

Fig. 3 shows a method for correcting the beams projected from such a reproduction;

Figure 4:
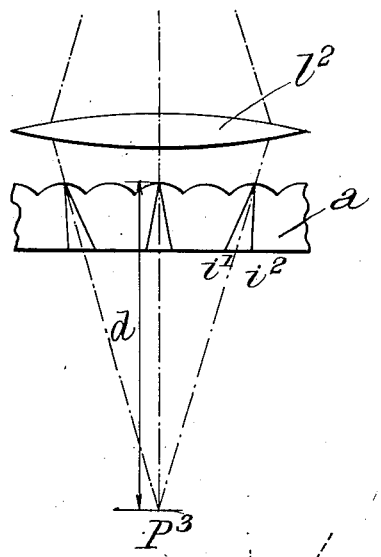
Fig. 4 shows a method for making an original film yielding a corrected copy.

It is generally known that when photographs are made on lenticular films (films "gaufrés" in French), a microscopic image of the filter (generally trichrome) is formed in the sensitive emulsion behind each of the lenticular elements of the film. This image is formed by substantially parallel rays coming from a determined point of the object being photographed which, after passing through an objective $o$ (Fig. 1), provided with a filter $f$, produces an image of the point in question on a lenticular element $e^1$ of a film $a$.

The problem of reproducing these images will now be considered.

The trajectory of a luminous beam $r^1$, $r^2$ coming from a point on the object photographed, traversing selector $f$ at its center $f^1$ and impinging on the sensitive emulsion at $i^c$ at the center of the corresponding image $i^1$, $i^2$ of the filter formed behind a given lenticular element $e^1$, will be designed as the "axis of an elementary beam".

Analysis shows that, in order that projection of a photograph with ordinary objectives be correct, the following conditions should obtain:

1. All the axes of the elementary beams coming from the photograph being projected should converge at the center of the selecting filter used for projection;

2. All the elementary beams should fall inside the limits of the filter used in projecting.

The first of these conditions is easily fulfilled in practice when original photographs are used for, in general, the point towards which the axes of the elementary beams converge is positioned, because of the method used in taking the photograph, at a predetermined distance in front of the latter.

The second condition may be fulfilled—assuming that the first condition obtains,—by employing any one of a number of available objectives, provided the form and position of the selecting filter used for projection is chosen so that all the rays traversing the filter are transmitted by the objective.

It is obvious that, in a lenticular negative made in the usual way, the distance between the photograph and what may be designated as the "point of concentration of the elementary beams" $p^o$, is equal to the distance $g$ of the film from the virtual image of the filter as seen through the back of the objective. When the negative is illuminated from behind, the elementary non-diffracted beams emanating therefrom will be oriented by the lenticular elements (external optical systems being assumed to be eliminated) so that the axes of the elementary beams converge at point $p^o$ situated at distance $g$ from the film. If elemetary beams $q$, $q'$, $q''$ and $r$, $r'$, $r''$ (Fig. 1ª), emanating from the elementary microscopic, marginal images $i^q$ and $i^r$ situated at the right and left hand limits of the negative, be followed in their trajectory—said elementary beams converging at $p^o$—it will be seen that all the elementary beams will lie between $i^q$ and $i^r$. It follows that (eliminating beams deviated by diffraction which do not change the nature of the phenomena described above) the total luminous beam will lie inside that region in Fig. 1ª limited by the dotted cross-hatched lines. In other words, the total beams have the truncated conical form $q$, $r$, $s^1$, $s^2$ topped by the truncated more flattened cone $s^1$, $s^2$, $r'$, $q''$.

From the foregoing it will be seen that the light beam emanating from a lenticular negative is of a very different form from that obtained with an ordinary photograph. In the first place, every lenticular photograph carries therewith, in all its displacements, a "point of concentration of its elementary beams" $p^o$, having particular optical properties, this point being comparable, by its existence and invariability, to the pole of a magnet when said pole is exterior to the latter. Secondly, inspection of Fig. 1a will show that the beam emanating from the negative when the latter is illuminated from behind does not diverge in proportion to the distance from the negative as is the case with an ordinary photograph, but instead diverges first slowly, then, after passing through plane $s^1$, $s^2$ containing $p^o$, more rapidly.

If the ratio between the section of the total beam and its distance from the negative be designated as the "relative aperture of the total beam", it will be seen that this "relative aperture" is smallest at plane $s^1$, $s^2$. It follows that the posterior opening of the objective should be positioned in this latter plane, for, when so positioned, it will receive a maximum amount of light in a minimum possible diameter.

Consider any given projecting objective intended to be used for projecting a lenticular film. It will now be shown that, contrary to the general belief, (1) it is quite unnecessary to place the projecting color filter in the same position relatively to the projecting objective as the corresponding filter and objective occupy during the taking of a picture, and (2) it is unnecessary to provide the same relative effective aperture in the projecting and camera objectives and their corresponding filters.

Examining point (1) first: In order that correct projection be obtained it is necessary to place the center of the projecting filter at point $p^o$ and that this filter have the diameter $s^1$, $s^2$; if the posterior lens of the projecting objective is positioned beyond $p^o$ relatively to the filter, the latter should be placed behind the objective even if the filter of the camera objective had been placed in front of the latter. There exists, therefore, no correlation whatever between the relative positions of the projecting and camera filters relatively to their corresponding objectives.

Examining, now point (2) above: It is evident from the analysis of the optical phenomena illustrated in Fig. 1a that the relative effective aperture of the projecting objective will vary in accordance with the position of the posterior lens of the latter when said posterior lens receives the total beam emanating from the film and that said aperture will be a minimum, other things being equal, in plane $s^1$, $s^2$. The maximum luminous efficiency of the projecting objective will be obtained when the projecting filter and the rear lens of the projecting objective lie in plane $s^1$, $s^2$.

In a well-known projecting apparatus now in common use for 16 mm. lenticular color films, the projecting filter is placed in front of the projecting objective whose effective aperture is about 25 mm., a compensating divergent lens being placed in front of and close to the film. The films used in this apparatus have a point $p^o$ at about 38 mm. from the film and the rear lens of the projecting objective is positioned about 40 mm. As indicated above, the color filter could then be placed at $p^o$ behind the objective and the divergent lens could be eliminated entirely. At the same time the effective aperture could be reduced from 25 mm. to 18 mm. The new process for projecting these lenticular films has thus much more simplicity and efficiency than the usual one.

In practice, and in a more general manner, either one of two cases may present themselves:

(1) The projecting objective and the position of the filter relatively thereto may be chosen ad libitum. In this case, the objective should be advantageously chosen so that its rear lens lies close to $p^o$, the filter being also placed at this latter point.

(2) The projecting objective is given and cannot be chosen; (a) if the objective corresponds approximately to the conditions just indicated, it will yield a maximum of light efficiency; (b) if, on the contrary, its rear lens is situated considerably in advance of $p^o$ and further from the film, it is advisable to move $p^o$ nearer to said rear lens by means of a divergent lens placed in front of, and near, the film. Objectives having too small an aperture for correct projection may thus be used to correctly project lenticular film. It will thus be seen that, because of the particular nature of the beams projected from a lenticular film, the following paradoxal result may be obtained: the necessary aperture of the projecting objective may be diminished by increasing the divergence of the beams falling thereon; (c) if the rear lens of the projecting objective is positioned between $p^o$ and the film, the effective aperture of the objective may be diminished by placing a convergent lens in front of, and near, the film so that $p^o$ is brought nearer to the rear lens of the objective.

All of the foregoing projecting systems apply to original lenticular photographs taken in the ordinary way.

However, when contact copies of the original photograph are used for projection, certain difficulties are introduced. In effect, if original photograph $a$ made in the usual manner is reproduced by placing an unexposed film $b$ in contact therewith with the lenticular surfaces facing one another (Fig. 2), each pair of lenticular elements $e^1$ and $e^2$ acts as an objective whose focal point lies in the sensitive layer positioned posteriorly thereto. It will thus be seen that parallel beams emanating from any given element of original $a$ are received by corresponding elements of copy $b$ in line therewith and any image $p^1$, $p^2$ of the filter on the copy $b$ will be "congruent" (superposable by rotation) with relation to the corresponding microscopic image $i^1$, $i^2$ of the original. It follows that, if, in the centre of the two films, the microscopic images are centered with respect to the axis of a pair of lenticular elements $e^1$ and $e^2$, they are, contrariwise, excentric thereto as the distance from the center of the film increases and in such a manner that the axes of the elementary beams of the copy intersect at the same point $P^1$ as those of the original. Otherwise expressed, the point of concentration $P^1$ of the elementary beam axes, in a copy by contact made in the ordinary conditions, lies behind the lenticular surface $e^2$ of the copy $b$ and at a distance equal to that which separates point $P^1$ from lenticular surface $e^1$, in front of original $a$ (Fig. 2).

Obviously the conditions for correct projection (without "dominants") using ordinary objectives are the same for copy and original. The copies obtained as above described are, therefor, inutilizable for normal projection since, ordinarily, point of concentration $P^1$ should lie in front of the lenticular film surface and not behind.

By using proper optical systems in the manner now to be described point of concentration of the axes of the elementary beams $p^1$ may be shifted to occupy a position at a given and finite distance in front of the copied photograph and so permit projection of the latter.

Any one of the following procedures may be used:

1. A convergent lengs $l^1$ may be placed in front of the copy to be projected (Fig. 3), the necessary lens opening being diminished in proportion to its proximity to the film, the lens curvatures being chosen to bring the axes of the elementary beams from the copy into focus from behind at a point $P^2$ situated at a chosen and finite distance in front of the latter. If desired, lens $l^1$ and the projection objective may be calculated *de plano* to have a form which will compensate their respective aberrations, $l^1$ and the objective thus forming a unitary optical system.

2. A convergent lens $l^2$ may be placed before original film $a$ when the original photograph is being made so that the axes of the elementary beams converge at a point $P^3$ chosen ad libitum at a finite distance $d$ behind $a$. The diameter of $l^2$ may be diminished in proportion to its proximity to $a$. With such an original (Fig. 4), copies will be produced by the contact method shown in Fig. 2, in which the axes of the elementary beams will converge at the distance $d$ in front of the lenticular surfaces thereof. The aberrations of lens $l^2$ and of the objective may be calculated to form a compensated optical system.

Figure 5:
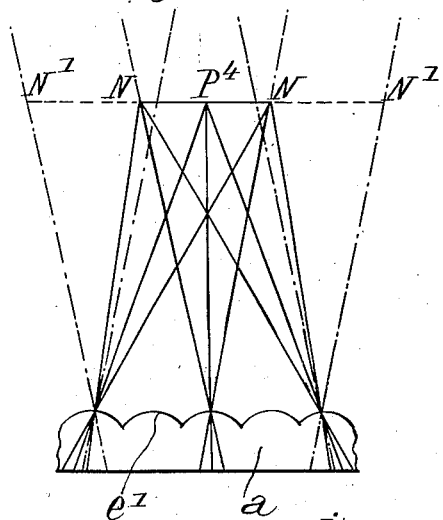
Fig. 5 is a diagram illustrating the relative section of beams emanating from a copy made from an original of the type shown in Fig. 4 and beams emanating from a photograph or copy produced by "collimation"

It may be noted that, prior inventors have proposed the use of objectives designed so that the "efferent pupil" (i. e. the image of the filter seen through the rear side of the objective) is at an infinite distance, or, at least, far in front of the sensitive layer whereby a "collimating" effect is obtained. The objective just described differs therefrom in that the "efferent pupil" lies at a finite distance and behind the sensitive layer. Copies made with these latter objectives may be projected through objectives stopped down to a very much greater extent than is possible with copies obtained by "collimation". Fig. 5 shows the difference between the two processes. In the one case, the axes of the elementary beams (full lines) converge at $P^4$ in front of the film, yielding a beam whose total section in the plane of $P^4$ is N N, while in the other case, the total section N' N' in the same plane of the elementary beams (dotted lines) emanating from a copy obtained by "collimation" for equivalent openings of the objective is considerably larger.

Figure 6:
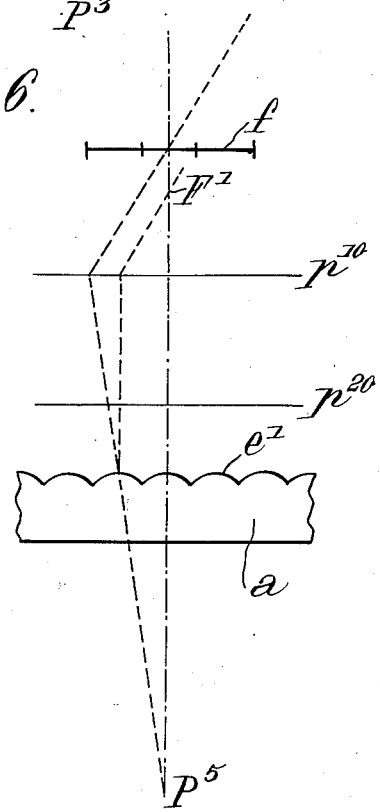
Fig. 6 shows a second method of producing originals yielding corrected copies.

3. An objective whose two principal planes are shown (Fig. 6) at $p^{10}$, $p^{20}$ may be used for taking the pictures in conjunction with a color filter $f$ functioning as diaphragm and positioned beyond anterior focal point $F^1$ at a predetermined distance from the former. The elementary beams will, therefor, converge at a point $P^5$ chosen ad libitum and situated at a finite distance behind original $a$. The latter will then yield copies in which the axes of the elementary beams converge at the same distance in front of the film. Certain recently developed objectives of recent design whose anterior focus is very close to the first lens lend themselves admirably to this variant of the general method.

Figure 7:
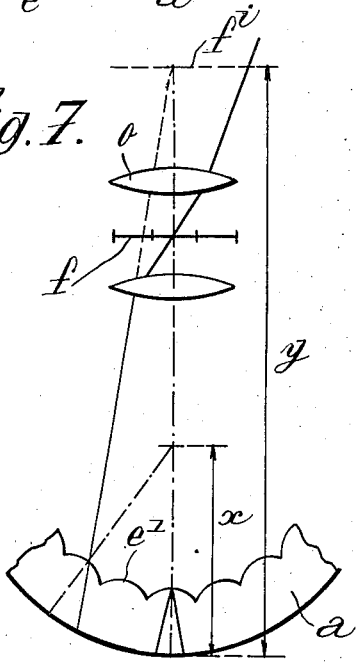
Fig. 7 illustrates a third method of obtaining originals yielding corrected copies.

4. The original film $a$ may be bent to have the form of a cylinder (Fig. 7) whose axis is parallel to the lines of separation of the color bands of the filter and whose radius $x$ may be given any desired value and then flattened for projection. The only and essential condition as to the value of $x$ is that it must be smaller than distance $y$ separating film $a$ from image $f^1$ of filter $f$ formed by the posterior part of the objective. Thus the flattened film, it will be noted, the point of convergence of the elementary beam axes will lie behind the sensitive surface and "contact" copies will, therefor, have a point of convergence of these axes in front of the sensitive layer.

The outstanding advantages in the hereinabove described methods of reproducing and projecting are (1) they permit the color screen, film or photograph and projecting objective to occupy different relative positions than the corresponding elements used for taking the picture, (2) maximum light efficiency is obtained, and (3) correct reproductions are either made from "corrected" originals or are corrected during projection.

What I claim is:—

1. In the method of correctly projecting lenticular color photographic copies the step of positioning the point where the axes of the elementary beams coming from a copy intersect in front of the lenticulations thereof at a finite predetermined distance and positioning a projecting filter at said point.

2. The method of forming and projecting lenticular photographic copies comprising the steps of forming a lenticular copy from a lenticular photograph by the contact method,—and projecting the copy so formed first through a convergent optical system designed so that the axes of the elementary beams coming from the copy intersect in front of the lenticulations thereof at a finite predetermined distance, and then through a projecting objective.

3. In a projecting assembly for lenticular photographic copies, a convergent optical system designed so that the axes of the elementary beams coming from a lenticular photographic copy intersect in front of the lenticulations thereof at a finite, determined distance,—means for projecting light through said convergent optical system and a projecting objective positioned to receive light emanating from said convergent optical system.

4. The method of producing lenticular photographic originals, comprising the step of directing light through the lenticular photographic elements of a film intended to become an original onto the sensitive surface thereof so that the axes of the elementary beams traversing the lenticulations and falling on said sensitive surface intersect on the side opposite the lenticulations at a finite, predetermined distance.

5. The method of producing lenticular photographic originals comprising the steps of bending a lenticular photographic film intended to become an original into cylindrical form, filtering light through a color filter, and directing the filtered light through the posterior lens of an objective onto the bent photographic film, the radius of curvature of the pohtographic film being less than its distance from the image of the filter produced by the posterior lens of the objective.

CHARLES NORDMANN.